US 10,184,531 B2

(12) United States Patent
Saito et al.

(10) Patent No.: US 10,184,531 B2
(45) Date of Patent: Jan. 22, 2019

(54) ROTATION TRANSMISSION DEVICE

(71) Applicant: NTN CORPORATION, Osaka (JP)

(72) Inventors: Takahide Saito, Shizuoka (JP); Koji Sato, Shizuoka (JP); Naotsugu Kitayama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 228 days.

(21) Appl. No.: 15/107,637

(22) PCT Filed: Dec. 10, 2014

(86) PCT No.: PCT/JP2014/082655
§ 371 (c)(1),
(2) Date: Jun. 23, 2016

(87) PCT Pub. No.: WO2015/098516
PCT Pub. Date: Jul. 2, 2015

(65) Prior Publication Data
US 2016/0319891 A1    Nov. 3, 2016

(30) Foreign Application Priority Data

Dec. 24, 2013 (JP) .................................. 2013-265029

(51) Int. Cl.
*F16D 27/112* (2006.01)
*F16D 41/066* (2006.01)
(Continued)

(52) U.S. Cl.
CPC .......... *F16D 41/066* (2013.01); *F16D 27/06* (2013.01); *F16D 27/108* (2013.01);
(Continued)

(58) Field of Classification Search
None
See application file for complete search history.

(56) References Cited

U.S. PATENT DOCUMENTS 3,087,588 A * 4/1963 Fischer ................. F16D 41/067
192/45.016
3,528,534 A * 9/1970 Benson ................. F16D 41/067
188/82.84
(Continued)

FOREIGN PATENT DOCUMENTS

CN          2595746      12/2003
CN          101850647    10/2010
(Continued)

OTHER PUBLICATIONS

Office Action dated Jan. 19, 2018 in Chinese Patent Application No. 201480068019.8, with English translation of Search Report.
(Continued)

*Primary Examiner* — Robert W Hodge
*Assistant Examiner* — Ryan P Dodd
(74) *Attorney, Agent, or Firm* — Wenderoth, Lind & Ponack, L.L.P.

(57) ABSTRACT

A rotation transmission device includes torque cams provided between opposed surfaces of a flange of a control retainer and a flange of a rotary retainer and configured to convert an axial movement of the control retainer to relative rotational motion between the two retainers. All of the torque cams are circumferentially offset from all of the pillars of the control retainer and all of the pillars of the rotary retainer, and a pair of cam grooves forming each torque cam are heat-treated only at their areas that are brought into contact with a ball of the torque cam, to increase the hardness of these areas, thus improving the durability of the retainers.

4 Claims, 6 Drawing Sheets

(51) Int. Cl.
*F16D 27/06* (2006.01)
*F16D 41/067* (2006.01)
*F16D 27/108* (2006.01)
*F16D 23/12* (2006.01)
*F16D 41/064* (2006.01)

(52) U.S. Cl.
CPC ...... *F16D 41/067* (2013.01); *F16D 2023/123* (2013.01); *F16D 2041/0646* (2013.01); *F16D 2041/0665* (2013.01); *F16D 2250/0053* (2013.01); *F16D 2300/10* (2013.01)

(56) References Cited

U.S. PATENT DOCUMENTS

| | | | | |
|---|---|---|---|---|
| 3,978,949 | A * | 9/1976 | Timtner | F16D 41/07 192/41 A |
| 5,156,246 | A * | 10/1992 | Iga | F16D 41/067 188/82.84 |
| 5,651,437 | A | 7/1997 | Organek et al. | |
| 6,394,249 | B1 * | 5/2002 | Tazumi | F16D 41/067 192/107 M |
| 6,419,272 | B1 * | 7/2002 | Yamaguchi | B60R 22/1954 280/806 |
| 9,103,384 | B2 * | 8/2015 | Akiyoshi | F16D 41/105 |
| 9,702,418 | B2 * | 7/2017 | Akiyoshi | F16D 41/088 |
| 2002/0060117 | A1 * | 5/2002 | Nakamura | F16D 41/067 192/45.018 |
| 2003/0029686 | A1 * | 2/2003 | Pascoe | F16D 41/088 192/45.004 |
| 2009/0263066 | A1 | 10/2009 | Wakabayashi | |
| 2010/0242758 | A1 | 9/2010 | Hugel | |
| 2013/0252745 | A1 | 9/2013 | Shirai | |
| 2013/0299298 | A1 | 11/2013 | Akiyoshi et al. | |
| 2014/0221108 | A1 | 8/2014 | Yamada | |
| 2015/0075936 | A1 | 3/2015 | Akiyoshi et al. | |

FOREIGN PATENT DOCUMENTS

| | | | | |
|---|---|---|---|---|
| CN | 103228941 | | 7/2013 | |
| JP | 3-125054 | | 12/1991 | |
| JP | 10-37980 | | 2/1998 | |
| JP | 2008-57668 | | 3/2008 | |
| JP | 2009-293679 | | 12/2009 | |
| JP | 2012-149746 | | 8/2012 | |
| WO | WO2012/099244 | * | 7/2012 | ............ F16D 41/08 |
| WO | 2013/027763 | | 2/2013 | |
| WO | 2013/150982 | | 10/2013 | |
| WO | WO2013/150982 | * | 10/2013 | ............ F16D 41/08 |

OTHER PUBLICATIONS

International Search Report dated Mar. 3, 2015 in International (PCT) Application No. PCT/JP2014/082655.
Written Opinion of the International Searching Authority dated Mar. 3, 2015 in International (PCT) Application No. PCT/JP2014/082655, with English translation.
Extended European Search Report dated Jan. 3, 2017 in corresponding European Application No. 14874627.4.

* cited by examiner

ROTATION TRANSMISSION DEVICE

TECHNICAL FIELD

This invention relates to a rotation transmission device used to selectively allow and prohibit transmission of rotation.

BACKGROUND ART

One known rotation transmission device used to selectively allow and prohibit transmission of rotation includes a two-way clutch configured to selectively couple and uncouple an input shaft and an output shaft, and an electromagnetic clutch configured to selectively engage and disengage the two-way clutch.

A rotation transmission device disclosed in JP Patent Publication 2009-293679A includes a control retainer and a rotary retainer that are mounted between an outer ring provided at an end of an output shaft and an inner ring provided at an input shaft so as to be disposed inside of the outer ring such that pillars of the control retainer circumferentially alternate with pillars of the rotary retainer, with pockets defined between adjacent pairs of the pillars of the respective retainers. The rotation transmission device further includes opposed pairs of rollers, each pair being received in one of the pockets, and elastic members each mounted between each opposed pair of rollers to bias the pair of rollers away from each other to standby positions where the rollers are engageable with a cylindrical surface formed on the inner periphery of the outer ring and cam surfaces formed on the outer periphery of the inner ring. When the inner ring rotates in one direction, one of each opposed pair of rollers engage the cylindrical surface and the cam surface, thereby transmitting the rotation of the inner ring to the outer ring.

This rotation transmission device further includes an electromagnetic clutch provided on the input shaft, which is provided with the inner ring, and is configured such that when the control retainer is moved by the electromagnetic clutch in one axial direction, the control retainer and the rotary retainer are rotated relative to each other in the direction in which the circumferential widths of the pockets decrease, by torque cams provided between opposed surfaces of flanges of the control retainer and the rotary retainer. As a result, each pair of rollers is moved, respectively, by the pillar of the control retainer and the pillar of the rotary retainer to disengaged positions, so that rotation is not transmitted from the inner ring to the outer ring.

This rotation transmission device is configured such that when the electromagnetic coil of the electromagnetic clutch is de-energized, the control retainer is moved in the direction in which the flange of the control retainer moves away from the flange of the rotary retainer. Simultaneously, the control retainer and the rotary retainer are rotated relative to each other in the direction in which the circumferential widths of the pockets increase under the biasing force of the elastic members mounted between the respective opposed pairs of rollers, so that the opposed pairs of rollers instantly engage the cylindrical surface and the cam surfaces. This rotation transmission device is thus advantageous in that there exist little gaps in the rotational direction, so that the rotation of the inner ring can be instantly transmitted to the outer ring.

In the rotation transmission device disclosed in JP Patent Publication 2009-293679A, if attempts were made to increase the hardness of the control retainer and the rotary retainer by heat-treating the entire retainers, their toughness would decrease to such an extent that cracks tend to develop at the roots of the pillars due to stress concentrations at the roots of the pillars. Thus, the control retainer and the rotary retainer of this rotation transmission device are used without being heat-treated.

In this case, since inclined cam surfaces of cam grooves forming each torque cam, on which a ball of the torque cam rolls, are low in hardness, the inclined cam surfaces tend to become worn due to contact with the ball. Also, the portions of the inclined cam surfaces that are brought into contact with the ball tend to develop dents. When the ball falls into such dents, the ball will interfere with relative rotation between the control retainer and the rotary retainer, thus affecting smooth operation of the two-way clutch. It is therefore desired to further improve the durability of the retainers of this rotation transmission device.

SUMMARY OF THE INVENTION

An object of the present invention is to improve the durability of the control retainer and the rotary retainer of a rotation transmission device.

In order to achieve this object, the present invention provides a rotation transmission device comprising: an input shaft; an output shaft arranged coaxially with the input shaft; a two-way clutch capable of selectively permitting and prohibiting transmission of rotation between the input shaft and the output shaft; and an electromagnetic clutch configured to selectively engage and disengage the two-way clutch. The two-way clutch comprises: an outer ring provided at an end portion of the output shaft and having an inner periphery; an inner ring provided at an end portion of the input shaft and having an outer periphery; a control retainer including a flange and a plurality of pillars provided on the flange; a rotary retainer including a flange and a plurality of pillars provided on the flange of the rotary retainer, the pillars of the control retainer and the pillars of the rotary retainer being disposed between the outer periphery of the inner ring and the inner periphery of the outer ring such that the pillars of the control retainer circumferentially alternate with the pillars of the rotary retainer, with pockets defined between adjacent pairs of the pillars of the control retainer and the pillars of the rotary retainer; pairs of engaging elements, each pair being received in each of the pockets; and elastic members each received in each of the pockets, and biasing the pair of engaging elements in the pocket away from each other. The rotation transmission device further comprises a plurality of torque cams disposed between the control retainer and the rotary retainer, and configured to convert an axial movement of the control retainer to a relative rotary motion between the control retainer and the rotary retainer. The torque cams each include an opposed pair of cam grooves formed in opposed surfaces of the flanges of the control retainer and the rotary retainer, respectively, and a ball received between the opposed pair of cam grooves.

The electromagnetic clutch includes an electromagnet, and the rotation transmission device is configured such that when the electromagnet is energized, the control retainer is moved in an axial direction. The control retainer and the rotary retainer are rotated relative to each other in a direction in which circumferential widths of the pockets decrease by means of the torque cams, such that the pairs of rollers are moved to positions where the rollers disengage from the inner periphery of the outer ring and the outer periphery of the inner ring.

Each of the opposed pair of cam grooves of each of the torque cams has a pair of inclined cam surfaces which are inclined in opposite directions to each other and which are subjected to heat treatment only at areas of the inclined cam surfaces that are brought into contact with the ball to increase the hardness of those areas.

For each of the opposed pairs of cam grooves of each torque cam, by heat-treating only the areas of the pair of inclined cam grooves inclined in opposite directions to each other, such heat treatment will increase the hardness of the surfaces of the cam grooves while hardly affecting the roots of the pillars, and thus ensuring toughness of the roots of the pillars. Such heat treatment thus prevents wear and deformation of the cam grooves, as well as damage to the roots of the pillars, thus improving the durability of the retainers.

Preferably, all of the torque cams are circumferentially offset from all of the pillars of the control retainer and all of the pillars of the rotary retainer. With this arrangement, it is possible to almost completely prevent the influence of the heat treatment on the roots of the pillars, and thus to further improve the durability of the retainers.

By setting the depths of heat treatment to within the range of 0.3 to 0.8 mm, it is possible to avoid the influence of heat treatment on the roots of the pillars. The heat treatment may be induction hardening or laser hardening.

ADVANTAGES OF THE INVENTION

According to the present invention, since all of the torque cams are circumferentially offset from all of the pillars of the control retainer and all of the pillars of the rotary retainer, and for each of the opposed pairs of cam grooves of each torque cam, only areas of the pair of inclined cam grooves inclined in opposite directions to each other are subjected to heat treatment, it is possible to locally harden only the areas of the retainers that are brought into contact with the balls of the torque cams, while ensuring the toughness of the roots of the pillars. This prevents wear and deformation of the inclined cam surfaces, as well as damage to the roots of the pillars, and thus improves the durability of the control retainer and the rotary retainer.

BRIEF DESCRIPTION OF THE DRAWINGS

FIG. 4($a$) is a sectional view taken along line IV-IV of FIG. 1; and FIG. 4($b$) is a sectional view showing a state in which rollers are engaged.

DETAILED DESCRIPTION OF THE INVENTION

Figure 1:
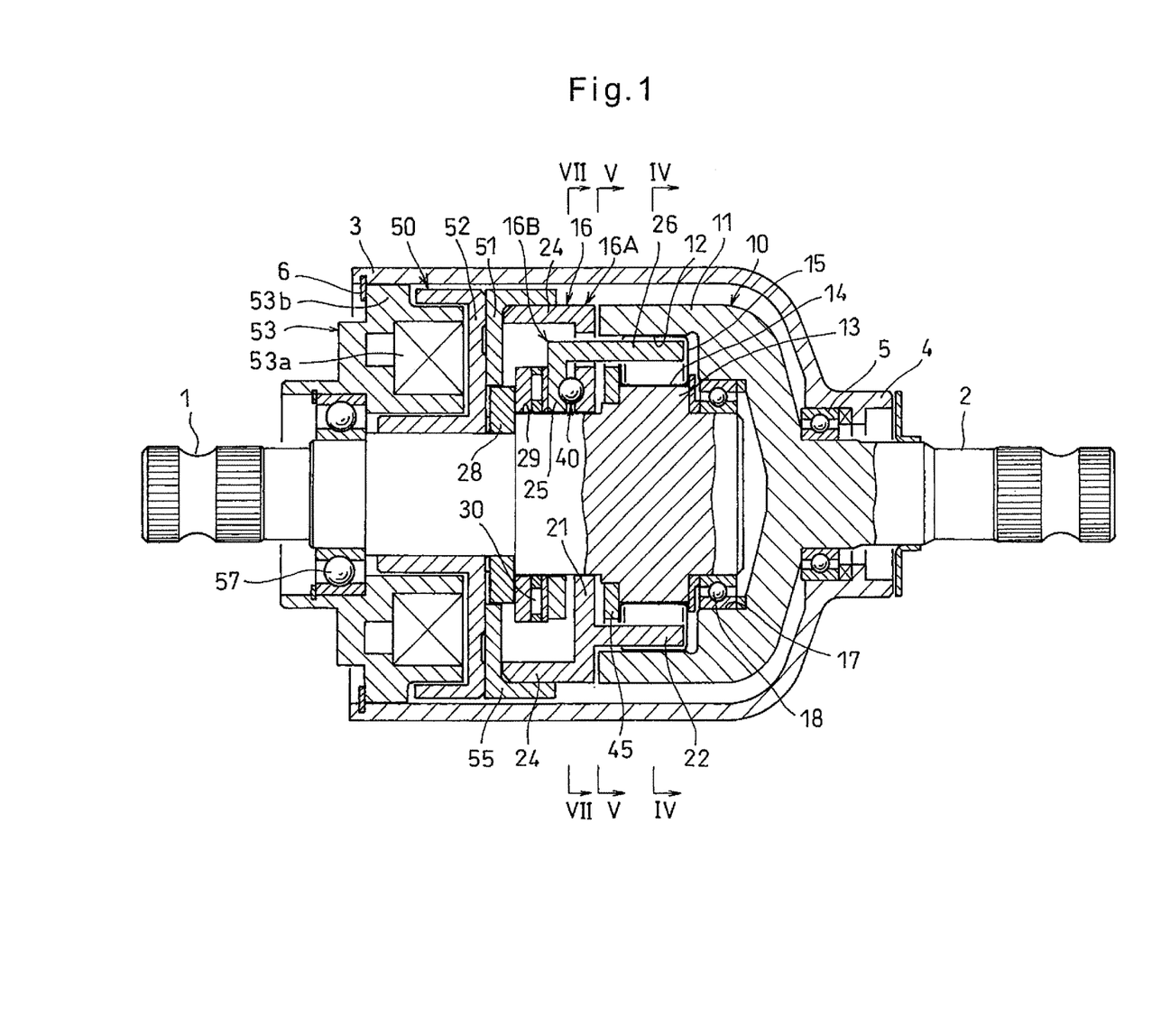
FIG. 1 is a vertical sectional view of a rotation transmission device embodying the present invention.

The embodiment of the present invention is now described with reference to the drawings. FIG. 1 shows a rotation transmission device embodying the present invention. As shown, the rotation transmission device comprises an input shaft 1, an output shaft 2 arranged coaxially with the input shaft 1, a housing 3 covering respective ends of the input shaft 1 and the output shaft 2, a two-way clutch 10 mounted in the housing 3 and configured to selectively allow and prohibit transmission of rotation from the input shaft 1 to the output shaft 2, and an electromagnetic clutch 50 for selectively engaging and disengaging the two-way clutch 10.

The housing 3 is a cylindrical member, and includes a small-diameter bearing tube 4 at one end thereof. The output shaft 2 is rotatably supported by a bearing 5 mounted in the bearing tube 4.

Figure 2:
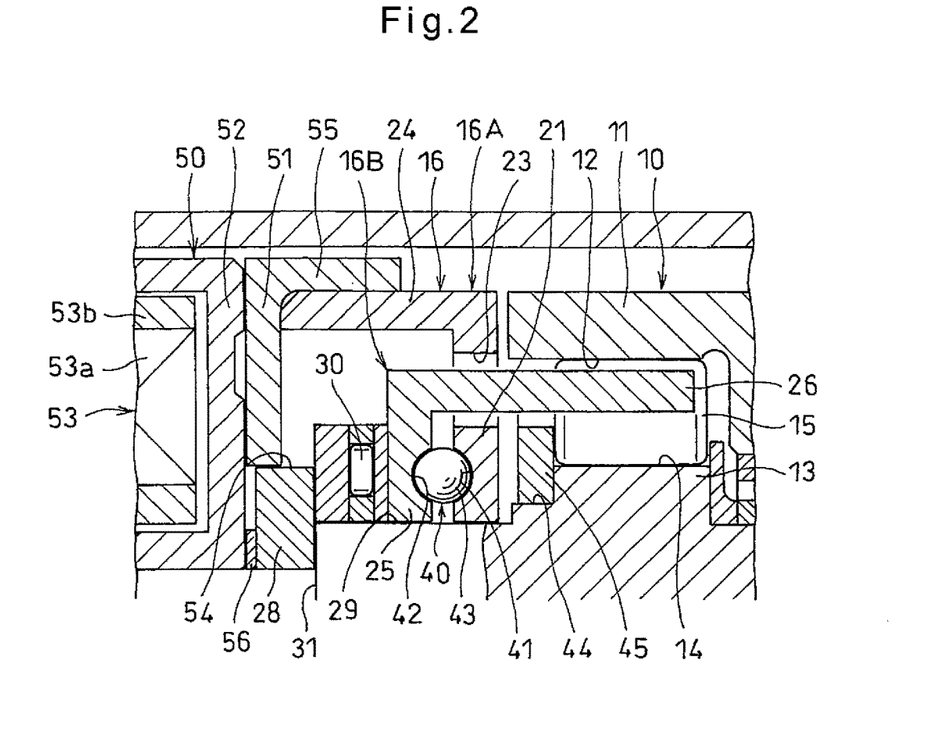
FIG. 2 is an enlarged sectional view of and around a two-way clutch of FIG. 1.
Figure 4:
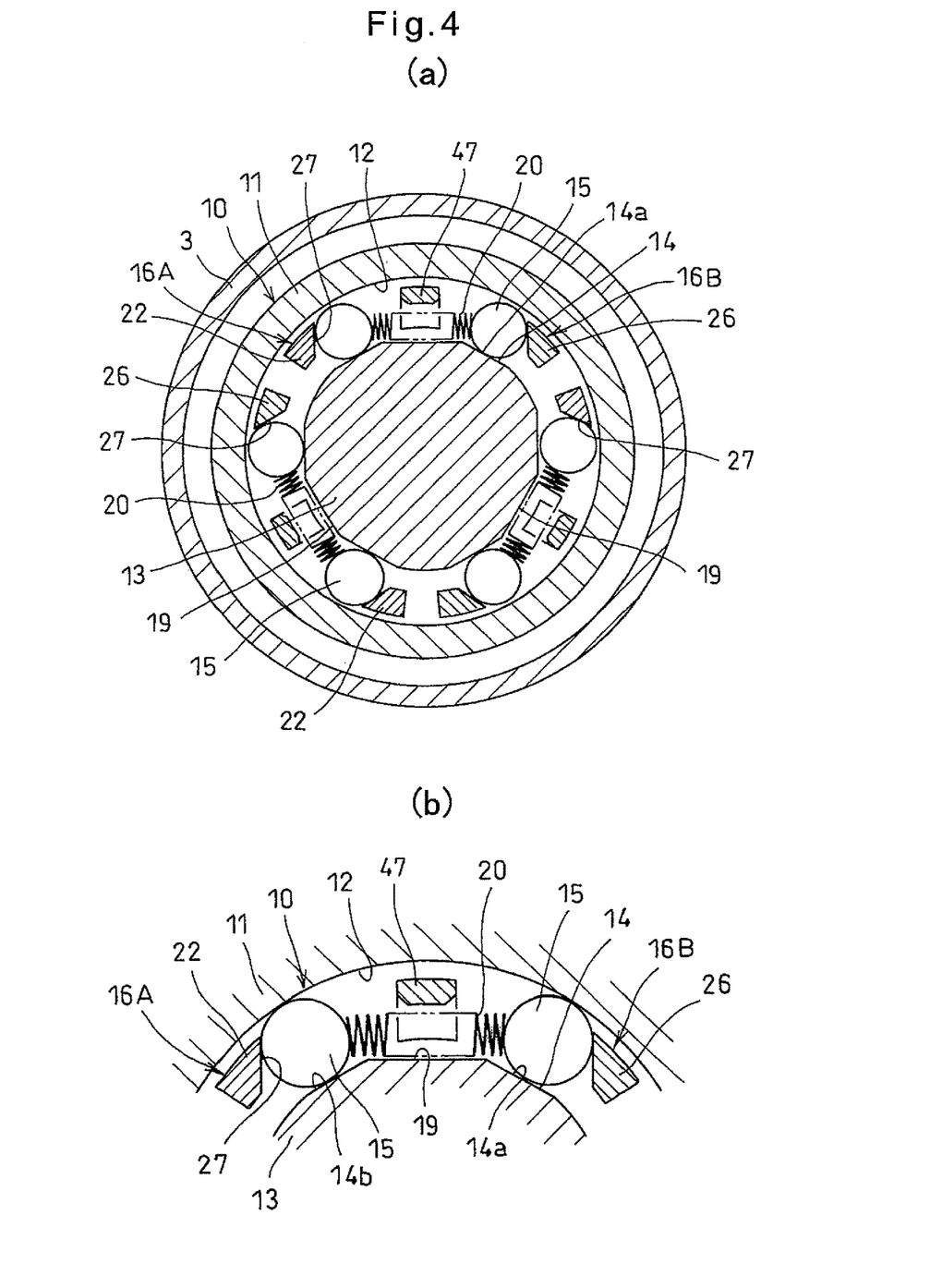

As shown in FIGS. 1, 2, 4($a$) and 4($b$), the two-way clutch 10 includes an outer ring 11 provided at the end of the output shaft 2 and formed with a cylindrical surface 12 on the inner periphery thereof, and an inner ring 13 provided at the end of the input shaft 1 and formed with a plurality of cam surfaces 14 on the inner periphery thereof so as to be circumferentially equidistantly spaced from each other. The two-way clutch 10 further includes pairs of rollers 15 as engaging elements, and elastic members 20. Each pair of rollers 15 and each elastic member 20 are mounted between each cam surface 14 and the cylindrical surface 12, with the rollers 15 retained by a retainer assembly 16. The two-way clutch 10 is configured such that when the inner ring 13 is rotated in one direction, one of each pair of rollers 15 engages the cylindrical surface 12 and the cam surface 14, thereby transmitting the rotation of the inner ring 13 to the outer ring 11, and when the inner ring 13 is rotated in the other direction, the other of each pair of rollers 15 engages the cylindrical surface 12 and the cam surface 14, thereby transmitting the rotation of the inner ring 13 to the outer ring 11.

The outer ring 11 has a closed end having an inner surface formed with a small-diameter recess 17 in which is mounted a bearing 18 rotatably supporting the end of the input shaft 1.

The inner ring 13 is integral with the input shaft 1. The cam surfaces 14 formed on the inner ring 13 are each constituted by a pair of inclined surface portions 14$a$ and 14$b$ defining a wedge-shaped space narrowing toward the respective circumferential ends thereof, between each inclined surface portion 14$a$, 14$b$ and the cylindrical surface 12 of the outer ring 11. A flat spring support surface 19 is provided between the inclined surface portions 14$a$ and 14$b$ of each cam surface 14 to extend in the tangential direction of the inner ring 13, and supports the corresponding elastic member 20.

The elastic members 20 comprise coil springs, and are each arranged between a pair of the rollers 15 to bias the pair of rollers 15 away from each other toward standby positions where the rollers 15 engage the cylindrical surface 12 and the cam surface 14.

Figure 7:
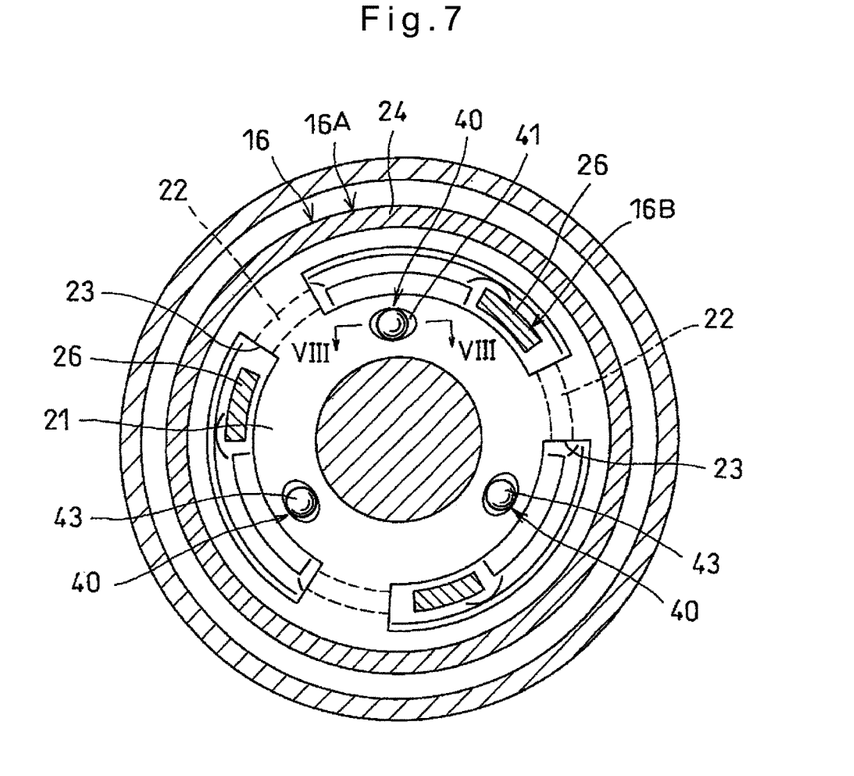
FIG. 7 is a sectional view taken along line VII-VII of FIG. 1.

The retainer assembly 16 comprises a control retainer 16A and a rotary retainer 16B. As shown in FIGS. 2 and 7, the control retainer 16A includes an annular flange 21, and pillars 22 which are equal in number to the cam surfaces 14 and extend from the outer peripheral portion of one side of the annular flange 21 so as to be circumferentially equidistantly spaced from each other. The annular flange 21 is formed with circular arc-shaped elongated holes 23 between the adjacent pillars 22. The control retainer 16A further includes a tubular portion 24 extending from the outer edge of the annular flange 21 in the direction opposite to the direction in which the pillars 22 extend from the annular flange 21.

The rotary retainer 16B includes an annular flange 25, and pillars 26 which are equal in number to the cam surfaces 14 and extend from the outer edge of the annular flange 25 so as be circumferentially equidistantly spaced from each other.

The control retainer 16A and the rotary retainer 16B are combined together such that the pillars 26 of the rotary retainer 16B are inserted through the elongated holes 23 of the control retainer 16A so as to be arranged circumferentially alternating with the pillars 22 of the control retainer 16A, with the distal ends of the pillars 22 and 26 of the control retainer 16A and the rotary retainer 16B disposed between the outer ring 11 and the inner ring 13, and with the flange 21 of the control retainer 16A and the flange 25 of the rotary retainer 16B disposed between the outer ring 11 and a support ring 28 fitted on the outer periphery of the input shaft 1.

With the control retainer 16A and the rotary retainer 16B mounted in position in this manner, as shown in FIGS. 4(a) and 4(b), pockets 27 are defined between the pillars 22 of the control retainer 16A and the pillars 26 of the rotary retainer 16B. The pockets 27 are radially opposed to the respective cam surfaces 14 of the inner ring 13, with an opposed pair of the rollers 15 and one of the elastic members 20 received in each pocket 27.

As shown in FIG. 2, the flange 21 of the control retainer 16A is slidably supported on a slide guide surface 29 formed on the outer periphery of the input shaft 1. The rotary retainer 16B is rotatably supported by a thrust bearing 30 mounted between the flange 25 of the rotary retainer 16B and the above-mentioned support ring 28, which is fitted on the input shaft 1.

The thrust bearing 30 rotatably supports rotary retainer 16B while preventing the rotary retainer 16B from moving toward the electromagnetic clutch 50.

Figure 8:
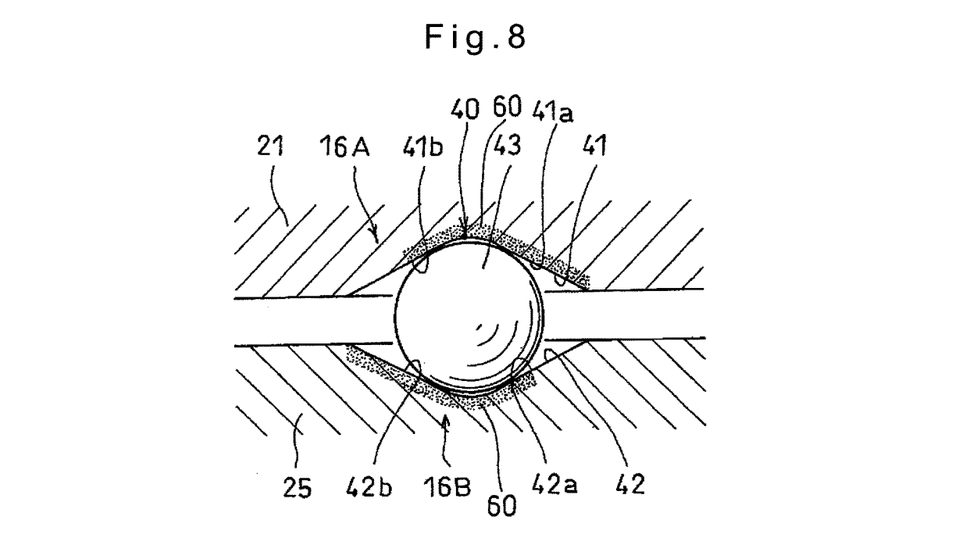
FIG. 8 is a sectional view taken along line VIII-VIII of FIG. 7.
Figure 9:
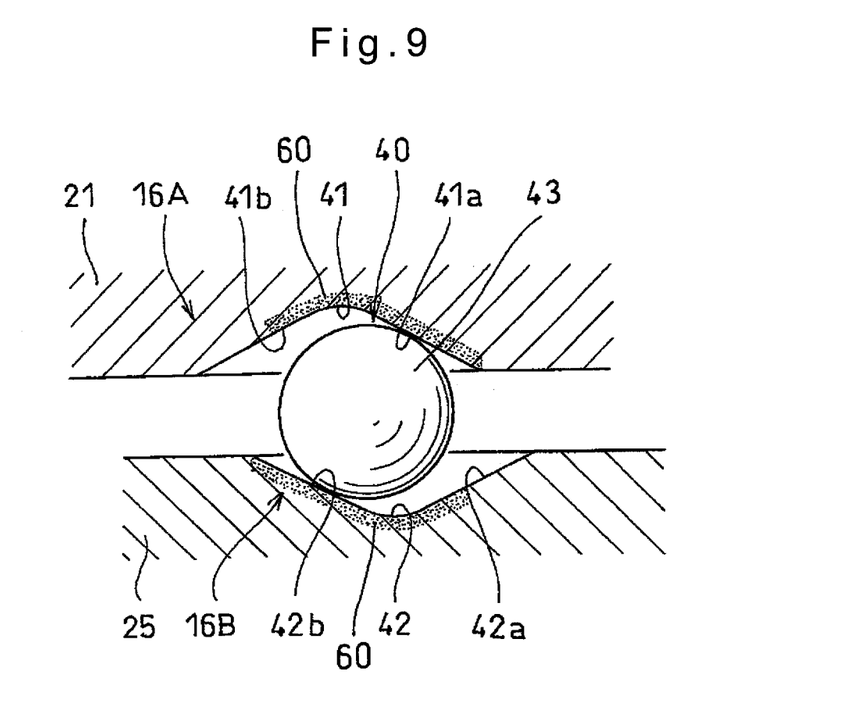
FIG. 9 is a sectional view showing a state before a torque cam is actuated.

As shown in FIGS. 2 and 7, torque cams 40 are provided between the flange 21 of the control retainer 16A and the flange 25 of the rotary retainer 16B. As shown in FIGS. 8 and 9, each torque cam 40 includes an opposed pair of cam grooves 41 and 42 formed, respectively, in the opposed surfaces of the flange 21 of the control retainer 16A and the flange 25 of the rotary retainer 16B. The cam grooves 41 and 42 are the deepest at the circumferential center thereof and gradually shallows toward the respective circumferential ends. The torque cam 40 further includes a ball 43 disposed between the opposed pair of cam grooves 41 and 42.

Each cam groove 41 is formed by a pair of inclined cam surfaces 41a and 41b inclined in opposite directions to each other, and thus has a V-shaped section. Similarly, each cam groove 42 is formed by a pair of inclined cam surfaces 42a and 42b inclined in opposite directions to each other, and has a V-shaped section.

The torque cams 40 are configured such that when the control retainer 16A is moved in one of the opposite axial directions in which the flange 21 of the control retainer 16A moves toward the flange 25 of the rotary retainer 16B, the balls 43 roll toward the deepest portions of the cam grooves 41 and 42 as shown in FIG. 8, thereby causing the control retainer 16A and the rotary retainer 16B to rotate relative to each other in the direction in which the circumferential widths of the pockets 27 decrease.

Figure 5:
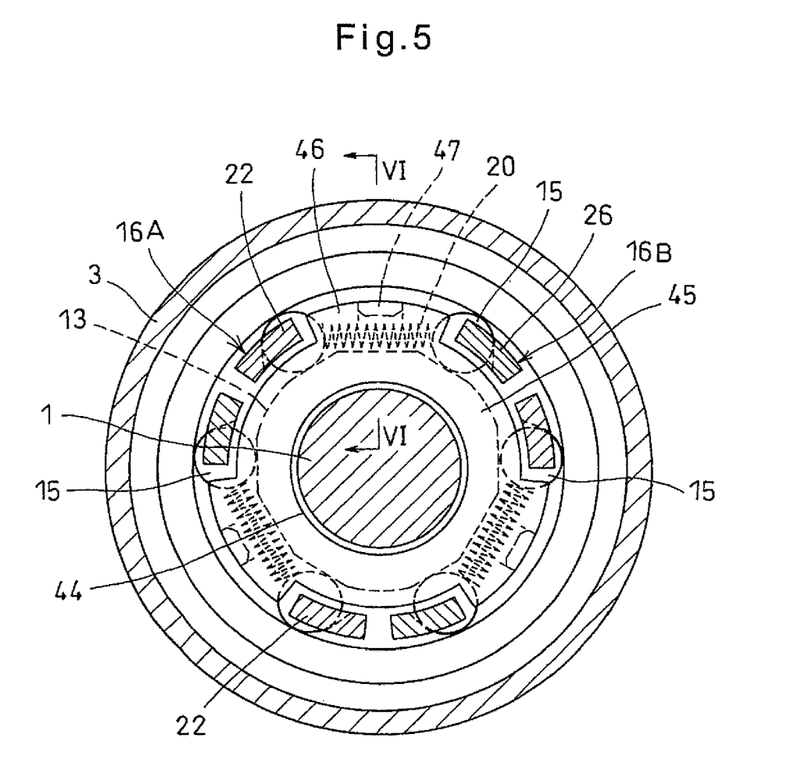
FIG. 5 is a sectional view taken along line V-V of FIG. 1.
Figure 6:
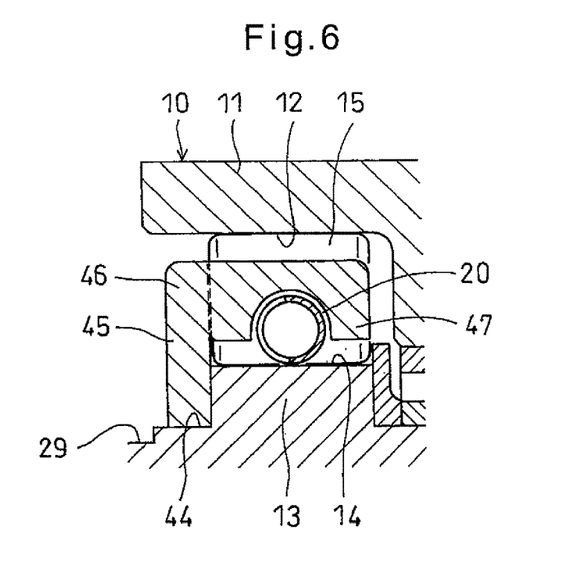
FIG. 6 is a sectional view taken along line VI-VI of FIG. 5.

As shown in FIGS. 2, 5 and 6, at the intersection between one axial end surface of the inner ring 13 and the slide guide surface 29, a cylindrical holder fitting surface 44 is formed which is larger in diameter than the slide guide surface 29. A spring holder 45 is fitted on the holder fitting surface 44.

The spring holder 45 is fixed relative to the holder fitting surface 44 both in the rotational and axial directions, and includes a plurality of anti-rotation pieces 46 on its outer periphery so as to be disposed between the pillars 22 of the control retainer 16A and the pillars 26 of the rotary retainer 16B.

The anti-rotation pieces 46 are configured such that when the control retainer 16A and the rotary retainer 16B rotate relative to each other in the direction in which the circumferential widths of the pockets 27 decrease, the pillars 22 of the control retainer 16A and the pillars 26 of the rotary retainer 16B are received and supported by the respective side edges of the anti-rotation pieces 46 such that the opposed pairs of rollers 15 are held in their neutral positions.

The spring holder 45 further includes spring retaining pieces 47 on its outer periphery. The spring retaining pieces 47 are disposed radially outwardly of the respective elastic members 20 to prevent the elastic members 20 from being radially outwardly pushed out of the spaces between the respective pairs of rollers 15.

As shown in FIG. 1, the electromagnetic clutch 50 includes an armature 51 axially opposed to an end surface of the tubular portion 24 of the control retainer 16A, a rotor 52 axially opposed to the armature 51, and an electromagnet 53 axially opposed to the rotor 52.

As shown in FIG. 2, the armature 51 is rotatably and slidably supported on the outer periphery of the support ring 28, and includes a coupling tube 55 provided at the outer peripheral portion of the armature 51. The tubular portion 24 of the control retainer 16A is press-fitted in the radially inner surface of the coupling tube 55, whereby the control retainer 16A is fixedly coupled to the armature 51. Since the control retainer 16A is fixedly coupled to the armature 51, the armature 51 is slidably supported at two axially separate locations, i.e., by a cylindrical radially outer surface 54 of the support ring 28 and the slide guide surface 29 on the outer periphery of the input shaft 1.

The support ring 28 is axially positioned by a step 31 formed at the other end, relative to the above-described one end of the housing 3, of the slide guide surface 29 of the input shaft 1.

The rotor 52 is fitted on the input shaft 1, and is axially positioned and rotationally fixed relative to the input shaft 1, by a shim 56 disposed between the rotor 52 and the support ring 28.

As shown in FIG. 1, the electromagnet 53 comprises an electromagnetic coil 53a, and a core 53b supporting the electromagnetic coil 53a. The core 53b is fitted in an opening of the housing 3 at the other end of the housing 3, and is prevented from being pulled out of the housing 3 by a snap ring 6 mounted in position in the opening of the housing 3 at the other end of the housing 3. The core 53b is rotatably supported by the input shaft 1 through a bearing 57 fitted on the input shaft 1.

The rotation transmission device of the embodiment is configured such that while the electromagnetic coil 53a of the electromagnetic clutch 50, shown in FIG. 1, is not energized, the rollers 15 of the two-way clutch 10 are, as shown in FIG. 4(b), in engagement with the cylindrical surface 12 of the outer ring 11 and the cam surfaces 14 of the inner ring 13.

Thus, in this state, when the input shaft 1 is rotated in one direction, the rotation of the input shaft 1 is transmitted to the outer ring 11 through the inner ring 13 and one of each pair of rollers 15, so that the output shaft 2 is rotated in the same direction as the input shaft 1. When the input shaft 1 is rotated in the other direction, its rotation is transmitted to the output shaft 2 through the other of each pair of rollers 15.

With the two-way clutch 10 engaged, when the electromagnetic coil 53a of the electromagnetic clutch 50 is energized, a magnetic attraction force is applied to the armature 51, so that the armature 51 is axially moved so as to be attracted to the rotor 52.

When the armature 51 is moved axially in this direction, since the armature 51 and the control retainer 16A are fixedly coupled together because the coupling tube 55 is fitted to the tubular portion 24, the control retainer 16A is moved in the direction in which the flange 21 of the control retainer 16A moves toward the flange 25 of the rotary retainer 16B.

When the control retainer 16A and the rotary retainer 16B move relative to each other in this direction, the balls 43 roll from the position shown in FIG. 9 to the deepest portions of the cam grooves 41 and 42 as shown in FIG. 8, thus causing the control retainer 16A and the rotary retainer 16B to rotate relative to each other in the direction in which the circumferential widths of the pockets 27 decrease.

When the control retainer 16A and the rotary retainer 16B rotate relative to each other in this direction, each pair of rollers 15, see e.g., FIG. 4(*b*), are pushed, respectively, by the pillar 22 of the control retainer 16A and the pillar 26 of the rotary retainer 16B, and moved toward each other.

This causes, as shown in FIG. 4(*a*), the rollers 15 to be moved to the respective neutral positions where the rollers 15 are not in engagement with the cylindrical surface 12 and the cam surfaces 14, i.e., disengages the two-way clutch 10.

With the two-way clutch 10 disengaged, when the input shaft 1 is rotated in one direction under torque applied to the input shaft 1, the anti-rotation pieces 46 of the spring holder 45 is pressed against either the pillars 22 of the control retainer 16A or the pillars 26 of the rotary retainer 16B, so that the control retainer 16A and the rotary retainer 16B rotate together with the input shaft 1. In this state, since the opposed pairs of rollers 15 are in their neutral/disengaged positions, the rotation of the input shaft 1 is not transmitted to the outer ring 11, so that the input shaft 1 rotates freely independently of the outer ring 11.

When the control retainer 16A and the rotary retainer 16B rotate relative to each other in the direction in which the circumferential widths of the pockets 27 decrease, the pillars 22 of the control retainer 16A and the pillars 26 of the rotary retainer 16B abut the respective side edges of the anti-rotation pieces 46 of the spring holder 45, thereby limiting the relative rotation between the control retainer 16A and the rotary retainer 16B in this direction.

This prevents the elastic members 20 from being compressed more than necessary, thus preventing damage to the elastic members 20 due to fatigue, even after repeated compression and expansion.

With the input shaft 1 rotating freely independently of the outer ring 11, when the electromagnetic coil 53a is de-energized, the magnetic attraction force applied to the armature 51 disappears, so that the armature 51 becomes freely rotatable. This causes, under the biasing force of the elastic members 20, the control retainer 16A and the rotary retainer 16B to rotate relative to each other in the direction in which the circumferential widths of the pockets 27 increase, thus moving the opposed pairs of rollers 15 to their standby positions where the rollers 15 engage the cylindrical surface 12 and the cam surfaces 14. As a result, the rotation of the input shaft 1 is transmitted to the output shaft 2 through one of each opposed pair of rollers 15.

When the input shaft 1 is stopped in this state, and then rotated in the opposite direction, the rotation of the input shaft 1 is transmitted to the output shaft 2 through the other of each opposed pair of rollers 15.

Since, as described above, by de-energizing the electromagnetic coil 53a, the control retainer 16A and the rotary retainer 16B rotate relative to each other in the direction in which the circumferential widths of the pockets 27 increase, thereby moving the opposed pairs of rollers 15 to the respective standby positions where the rollers 15 can instantly become wedged between the cylindrical surface 12 and the cam surfaces 14, there exist little gaps in the rotational direction in this state, so that the rotation of the inner ring 13 can be instantly transmitted to the outer ring 11.

Also, since torque is transmitted from the input shaft 1 to the output shaft 2 through as many rollers 15 as the cam surfaces 14, it is possible to transmit large toque from the input shaft 1 to the output shaft 2.

When the control retainer 16A and the rotary retainer 16B rotate relative to each other in the direction in which the circumferential widths of the pockets 27 increase, the balls 43 roll toward shallow portions of the respective cam grooves 41 and 42 until the state shown in FIG. 9 is reached.

Since, as described above, the two-way clutch 10 engages when the electromagnetic clutch 50 is turned off by de-energizing the electromagnet 53, and disengages when the electromagnetic clutch 50 is turned on by energizing the electromagnet 53, this arrangement is extremely beneficial in applications where a failsafe function is required.

The torque cams 40, one of which is shown in FIG. 8, are configured such that by energizing and de-energizing the electromagnetic coil 53a of the electromagnetic clutch 50, the balls 43 roll in the respective cam grooves 41 and 42, thereby rotating the control retainer 16A and the rotary retainer 16B relative to each other. When the retainers 16A and 16B rotate relative to each other, since the balls 43 roll with the combined biasing force of the elastic members 20 always applied to the balls 43, the inclined cam surfaces 41a and 42b of the cam grooves 41 and 42 could become worn or deformed if the inclined cam surfaces 41a and 42b are low in hardness.

Deformation of the cam surfaces 41a and 42b of the cam grooves 41 and 42 interferes with the relative rotation between the control retainer 16A and the rotary retainer 16B, thereby making it impossible to actuate the two-way clutch 10 with high accuracy. Thus, in order to actuate the two-way clutch 10 with high accuracy, it is necessary to take into consideration the durability of the control retainer 16A and the rotary retainer 16B.

Heat treatment is a typical method for improving the durability. However, if the entire control retainer 16A and the entire rotary retainer 16B are subjected to heat treatment, their toughness will decrease to such an extent that cracks tend to develop at the roots of the pillars 22 and 26 due to stress concentrations at the roots of the pillars 22 and 26 when the rollers 15 are pushed and moved to the neutral positions.

Figure 3:
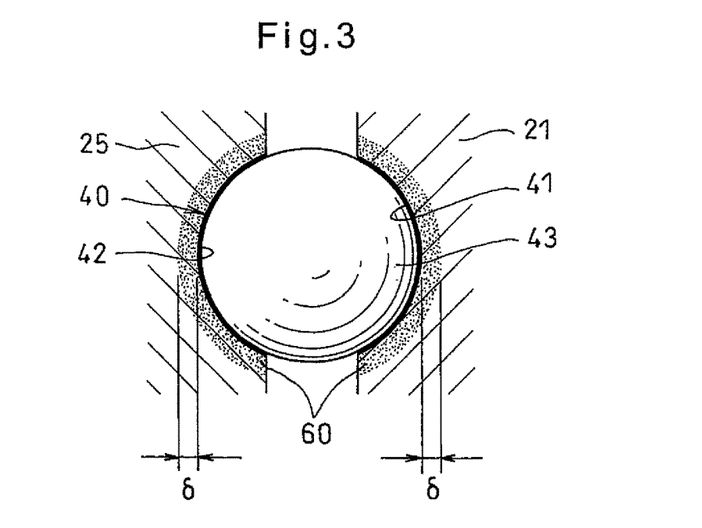
FIG. 3 is an enlarged sectional view of and around a torque cam of FIG. 2.

Thus, in the embodiment, only the areas of the pair of inclined cam surfaces 41a and 41b, 42a and 42b of each cam groove 41, 42 that are brought into contact with the ball 43 are subjected to heat treatment to form, as shown in FIG. 3, a hardened layer 60 on the surface of each cam groove 41, 42. If the depth 6 of heat treatment is deeper than necessary, such heat treatment tends to influence the roots of the pillars 22 and 26 in such a manner as to reduce the strength of the roots of the pillars 22 and 26. Thus, the depth 6 of heat treatment is set within the range of 0.3 to 0.8 mm.

By such local heat treatment, i.e., by heat treating only the areas of the pair of inclined cam surfaces 41a and 41b, 42a and 42b of each cam groove 41, 42 that are brought into contact with the ball 43, it is possible to locally harden only portions of the surfaces of the cam grooves 41 and 42 that are brought into contact with the balls 43, while ensuring high toughness of the pillars 22 and 26 at their roots, thereby preventing wear and deformation of the surfaces of the cam grooves 41 and 42, as well as damage to the roots of the pillars 22 and 26. This results in improved durability of the control retainer 16A and the rotary retainer 16B.

Such heat treatment may be induction hardening or laser hardening. For the purpose of such hardening, the control retainer 16A and the rotary retainer 16B are formed of carbon steel or a ferrous sintered material. Carbon steel may be, for example, S35C, S45C, SCM or SUJ2.

In order to avoid the influence of the heat treatment on the pillars 22 and 26, the torque cams 40 are provided circumferentially offset from the pillars 22 and 26 as shown in FIG. 7. Therefore, the range of heat treatment does not overlap with the pillars 22 and 26.

Specifically, taking into consideration the areas affected by hardening when the hardening is performed by a laser, the torque cams 40 are preferably arranged such that the distances between the circumferential ends of all of the pillars 22 and 26 and the circumferential ends of all of the inclined cam surfaces 41a and 42b are 4 mm or over. Taking the balance into consideration, the torque cams 40 are more preferably arranged so as to be equally distanced (spaced) from the respective adjacent pairs of pillars 22 and 26.

While it is preferable to provide the torque cams 40 so as to be circumferentially offset from the pillars 22 and 26, in the diametrical direction, taking the strength into consideration, the torque cams 40 are preferably provided at the diametrically central portions of the flanges 21 and 25 of the control retainer 16A and the rotary retainer 16B.

DESCRIPTION OF THE REFERENCE NUMERALS

1. Input shaft
2. Output shaft
10. Two-way clutch
11. Outer ring
12. Cylindrical surface
13. Inner ring
14. Cam surface
15. Roller (engaging element)
16A. Control retainer
16B. Rotary retainer
20. Elastic member
21. Flange
22. Pillar
25. Flange
26. Pillar
41. Cam groove
41a. Inclined cam surface
41b. Inclined cam surface
42. Cam groove
42a. Inclined cam surface
42b. Inclined cam surface
43. Ball
50. Electromagnetic clutch
53. Electromagnet

What is claimed is:
1. A rotation transmission device comprising:
an input shaft;
an output shaft arranged coaxially with the input shaft;
a two-way clutch capable of selectively permitting and prohibiting transmission of rotation between the input shaft and the output shaft; and
an electromagnetic clutch configured to selectively engage and disengage the two-way clutch;
wherein the two-way clutch comprises:
an outer ring provided at an end portion of the output shaft and having an inner periphery;
an inner ring provided at an end portion of the input shaft and having an outer periphery;
a control retainer including a flange and a plurality of pillars provided on the flange;
a rotary retainer including a flange and a plurality of pillars provided on the flange of the rotary retainer, wherein the pillars of the control retainer and the pillars of the rotary retainer are disposed between the outer periphery of the inner ring and the inner periphery of the outer ring such that the pillars of the control retainer circumferentially alternate with the pillars of the rotary retainer, with pockets defined between adjacent pairs of the pillars of the control retainer and the pillars of the rotary retainer;
pairs of rollers, each pair being received in each of the pockets; and
elastic members each received in each of the pockets, and biasing the pair of rollers in the pocket away from each other,
wherein the rotation transmission device further comprises a plurality of torque cams disposed between the control retainer and the rotary retainer, and configured to convert an axial movement of the control retainer to a relative rotary motion between the control retainer and the rotary retainer, the torque cams each including an opposed pair of cam grooves formed in opposed surfaces of the flanges of the control retainer and the rotary retainer, respectively, and a ball received between the opposed pair of cam grooves,
wherein the electromagnetic clutch includes an electromagnet, and wherein the rotation transmission device is configured such that when the electromagnet is energized, the control retainer is moved in an axial direction, and the control retainer and the rotary retainer are rotated relative to each other in a direction in which circumferential widths of the pockets decrease by means of the torque cams, such that the pairs of rollers are moved to positions where the rollers disengage from the inner periphery of the outer ring and the outer periphery of the inner ring,
wherein each of the opposed pair of cam grooves of each of the torque cams has a pair of inclined cam surfaces which are inclined in opposite directions to each other and which are subjected to heat treatment only at areas of the inclined cam surfaces that are brought into contact with the ball to increase hardness of said areas, and
wherein each of the torque cams is circumferentially offset from an adjacent pair of pillars such that the torque cams are equally spaced apart from each of pillars of the adjacent pair of pillars such that a distance between circumferential ends of each of the pillars and a circumferential end of an adjacent one of the inclined cam surface is at least 4.0 mm.

2. The rotation transmission device of claim 1, wherein said areas of the inclined cam surfaces are subjected to the heat treatment to depths of 0.3 to 0.8 mm.

3. The rotation transmission device of claim 1, wherein the heat treatment is one of induction hardening and laser hardening.

4. The rotation transmission device of claim 2, wherein the heat treatment is one of induction hardening and laser hardening.

* * * * *